United States Patent Office 3,117,917
Patented Jan. 14, 1964

3,117,917
PROCESS FOR THE PRODUCTION OF
ERGOT ALKALOIDS
Robert A. Adams, Elkhart, Ind., assignor to Miles
Laboratories, Inc., Elkhart, Ind., a corporation of
Indiana
No Drawing. Filed Mar. 5, 1962, Ser. No. 177,209
8 Claims. (Cl. 195—81)

This invention relates to the production of ergot alkaloids by saprophytic cultures.

Heretofore, the production of such alkaloids was a laborious task, with the world's supply being obtained by the annual collection of ergot from naturally or artificially infected rye, largely in eastern Europe, the center of this operation. This method of production is subject to climatic variations which cause resulting fluctuations in supply and price. To date, numerous efforts have been made to develop a successful method of obtaining these alkaloids by synthesis or from cultures of fungi grown saprophytically, but these have been marked by a low yield and poor results even though attempted under controlled conditions. Various techniques have been employed to overcome this problem of low yield such as suppressing cellular respiration, producing anaerobic conditions and creating artificial nutrient deficiencies. Additional work has shown that the presence of zinc and iron ions in the medium contributes to the production of these ergot alkaloids but in all of these instances, the incubation period required was a lengthy one.

The utility of ergot alkaloids has long been known for its medical properties as an oxytocic agent. Recent work on clavine derivatives recovered from the fermentation of strains of *Claviceps purpurea* has demonstrated a physiological activity similar to ergometrine in its ability to cause uterine contractions.

An object of this invention is to provide an easily controlled method of producing high yields of ergot alkaloids.

Another object is to provide a preparative process for producing ergot alkaloids in increased yield by saprophytic fermentation.

A further object is to create an inexpensive method for commercial production.

An additional object is the utilization of a process resulting in a decreased incubation period with a correspondingly high yield of alkaloid production.

It has now been discovered that greater yields of ergot alkaloids may be realized when a suitable culture medium is inoculated initially with a selected strain of *Claviceps purpurea* and a small volume of a lower aliphatic alcohol is subsequently added. This increased yield is accompanied by a corresponding decrease in pigment formation which is believed to be caused by the effect of the alcohol on the equilibrium along the metabolic pathway of the organism, although the exact mechanism of the action is unknown at the present time.

According to the present invention, a suitable strain of ergot can be saprophytically cultured on a suitable medium under prescribed conditions with the addition of lower aliphatic alcohols such as methanol, 95% ethanol, n-propanol and n-butanol to accomplish higher yields of ergot alkaloids.

This process is initiated by first inoculating a sterile starter medium containing various mineral salts, carbohydrate, and a source of nitrogen, with an alkaloid producing strain of *Claviceps purpurea*. After a two week growth period, transfers are made from the resulting mycelial mat by homogenizing the culture in a Waring Blendor and inoculating the fermentation medium with the homogenate The actual fermentation employs a medium containing a carbohydrates, nitrates, standard mineral salts, tap water and corn steep liquor which is placed in a 20-liter glass carboy equipped with an addition tube, sampling tube, air outlet tube and air inlet tube for forced aeration above the surface. A magnetic stirring bar is placed in the carboy and the medium autoclaved for 20 minutes at 20 lbs. The carboy is then placed on its side in a special support which allows the stirring unit to be placed beneath it. The initial pH of the medium is 4.5 and the range is maintained between 4.0 and 6.5, lowered by the addition of sulfuric or hydrochloric acid and raised by the addition of potassium hydroxide. The temperature is maintained between 20–30° C. and when the mycelial mat forms aeration is started at two-cubic feet per hour and is maintained during the entire run. When the mat growth has begun to mature, alcohol is added and the medium is mixed for a few minutes by means of the magnetic stirring unit. Daily mixing of the medium for a few minutes is continued throughout the fermentation period. When maximum alkaloidal yield is reached, the medium is withdrawn and carefully replaced with fresh sterile medium, care being taken so that the mycelial mat is not wetted. Alcohol is again added at this point and at each subsequent time when new replacement medium is inserted into the carboy for an additional incubation period. The medium containing the alkaloid is drawn off, filtered and the alkaloids adsorbed on a suitable adsorbent, such as fuller's earth. Elution of the alkaloids from the adsorbent is carried out with organic solvents. The alkaloids are then purified by column chromatography and crystallization.

The following examples are given to illustrate the invention but are not to be construed as limiting the scope of the inventive concept in any way.

Example I

A strain of *Claviceps purpurea* was grown as a surface culture on a starter culture medium having the following composition:

| | | |
|---|---|---|
| $KH_2PO_4$ | gm | 2.0 |
| $MgSO_4.7H_2O$ | gm | 1.0 |
| $FeSO_4.7H_2O$ | mg | 10.0 |
| $ZnSO_4.7H_2O$ | mg | 8.0 |
| $CuSO_4.7H_2O$ | mg | 0.4 |
| $MnCl_2.4H_2O$ | mg | 0.07 |
| $H_3BO_3$ | mg | 0.05 |
| $(NH_4)_6Mo_7O_{14}.4H_2O$ | mg | 0.04 |
| Glucose | gm | 50 |
| Casamino acid (Difco Tech) | gm | 20.0 |
| Distilled water to make 1 liter. | | | with an initial pH of 4.0 and after incubation for 2 weeks, a homogenate of the culture was obtained by use of a Waring Blendor. 5 ml. of this homogenate was then used to inoculate a 20 liter glass carboy containing surface fermentation medium having the following composition:

| | | |
|---|---|---|
| Glucose | percent | 5 |
| $KNO_3$ | percent | 1.5 |
| Corn steep liquor | percent | 0.1 |
| $KH_2PO_4$ | percent | 0.2 |
| $MgSO_4.7H_2O$ | percent | 0.1 |
| $FeSO_4.7H_2O$ | mg | 1.0 |
| $ZnSO_4.7H_2O$ | mg | 0.8 |
| $CuSO_4.7H_2O$ | mg | 0.04 |
| $MnCl_2.4H_2O$ | mg | 0.007 |
| $H_3BO_3$ | mg | 0.005 |
| $(NH_4)_6Mo_7O_{14}.4H_2O$ | mg | 0.004 |
| Tap water to volume. | | | and maintained at 25° C. Once growth began, aeration was started and maintained. Sixteen days after inoculation 95% ethanol was added to a 1% concentration in the medium. After a further growth period of 14 days, the alkaloid concentration was determined to be 0.092% as compared with a control yield of 0.080%. The method used for quantitating the alkaloids present in the fermentation medium consisted of pipetting one ml. of the alkaloid containing medium into a 10 ml. separatory funnel and making this basic with ammonium hydroxide. A sample of this medium was then diluted and the absorbance at 280 millimicrons was measured against a similar extract of medium containing no alkaloids. The alkaloid content was then determined from a standard curve obtained at that wavelength with agroclavine. The control was prepared and inoculated with the same homogenate under the exact conditions with the exception that no ethanol was added.

At this point, the nutrient medium was withdrawn in both the control and the alcohol-supplemented cultures, and sterile medium was added as a replacement. This medium was now incubated for 11 days and the alkaloid yield once again calculated. The ethanol-supplemented medium showed a concentration of 0.075% as compared with the control yield of only 0.043%.

*Example II*

Under the same process as described in Example I, a homogenate of starter culture of *Claviceps purpurea* was obtained. 95% ethanol was added as a supplement in the amount of 0.84% to this surface fermentation medium which had been inoculated with the homogenate of *Claviceps purpurea* culture. After 11 days of incubation under identical conditions as decided in detail in Example I the alkaloid concentration was calculated to be 0.041% in the alcohol supplemented medium and only 0.018% in the control.

*In Summary.*—This invention relates to a process of supplementally adding a lower aliphatic alcohol in concentrations of between 0.1–2% to a saprophytic culture medium of *Claviceps purpurea* under controlled conditions, resulting in an increased yield of the alkaloid content.

What is claimed is:

1. A process for the production of ergot alkaloids by saprophytic culture of *Claviceps purpurea* which comprises adding to a carbohydrate containing nutrient, a lower aliphatic alcohol in a concentration of between about 0.1% and 2%, incubating the inoculated culture medium at a pH of between 4.0–6.5, at a temperature of about between 20–30° C., separating the resultant mycelium from the culture solution and recovering the alkaloids from the culture medium.

2. A process as described in claim 1 wherein the alcohol added is a lower aliphatic alcohol selected from the group consisting of methanol, ethanol, isopropanol and n-butanol.

3. A process as described in claim 1 in which the alcohol used is methanol.

4. A process as described in claim 1 in which the alcohol used is ethanol.

5. A process as described in claim 1 in which the alcohol used is isopropanol.

6. A process as described in claim 1 in which the alcohol used is n-butanol.

7. A process as described in claim 1 in which the ergot alkaloids recovered are of the clavine type.

8. A process as described in claim 1 wherein the incubation of the inoculated culture medium takes place in a surface fermentation.

References Cited in the file of this patent

UNITED STATES PATENTS

| | | |
|---|---|---|
| 2,809,920 | Stoll et al. | Oct. 15, 1957 |
| 2,936,266 | Windisch et al. | May 10, 1960 |

OTHER REFERENCES

Porter: Bacterial Chemistry and Physiology, John Wiley & Sons, Inc., New York, 1946, pp. 799–800. (Copy in Div. 63.)

UNITED STATES PATENT OFFICE
CERTIFICATE OF CORRECTION

Patent No. 3,117,917                                       January 14, 1964

Robert A. Adams

It is hereby certified that error appears in the above numbered patent requiring correction and that the said Letters Patent should read as corrected below.

Column 1, line 13, for "task." read -- task, --; line 72, strike out "a"; column 2, line 48, for "Casamino acid" read -- Casamino Acids --; line 49, after "liter" strike out the period; lines 61 to 66, after "mg", each occurrence, insert a percent sign; line 64, for "$MnCl_2 4H_2O$" read -- $MnCl_2 \cdot 4H_2O$ --; same column 2, line 67, after "volume" strike out the period.

Signed and sealed this 23rd day of June 1964.

(SEAL)
Attest:

ERNEST W. SWIDER                                  EDWARD J. BRENNER
Attesting Officer                                      Commissioner of Patents